(12) United States Patent
Jactat (10) Patent No.: US 11,700,091 B2
(45) Date of Patent: *Jul. 11, 2023

(54) BEARER CONTROL

(71) Applicant: JRD COMMUNICATION (SHENZHEN) LTD., Guangdong (CN)

(72) Inventor: Caroline Jactat, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 2 days.

This patent is subject to a terminal disclaimer.

(21) Appl. No.: 17/245,434

(22) Filed: Apr. 30, 2021

(65) Prior Publication Data

US 2021/0250140 A1    Aug. 12, 2021

Related U.S. Application Data

(63) Continuation of application No. 16/499,176, filed as application No. PCT/CN2018/084158 on Apr. 24, 2018, now Pat. No. 11,018,817.

(30) Foreign Application Priority Data

Jun. 16, 2017 (GB) .................. 1709615

(51) Int. Cl.
*H04L 5/00* (2006.01)
*H04W 76/22* (2018.01)
*H04W 72/23* (2023.01)

(52) U.S. Cl.
CPC ........... *H04L 5/0032* (2013.01); *H04W 72/23* (2023.01); *H04W 76/22* (2018.02)

(58) Field of Classification Search
CPC ..... H04W 76/20; H04W 12/04; H04W 36/00; H04W 76/15; H04W 76/27
See application file for complete search history.

(56) References Cited

U.S. PATENT DOCUMENTS

| | | | |
|---|---|---|---|
| 6,751,227 | B1 | 6/2004 | Ahmavaara et al. |
| 2015/0215826 | A1 | 7/2015 | Yamada |
| 2016/0044639 | A1 | 2/2016 | Yi et al. |
| 2016/0135095 | A1 | 5/2016 | Wu |

(Continued)

FOREIGN PATENT DOCUMENTS

| | | | |
|---|---|---|---|
| EP | 2 182 765 A2 | | 5/2010 |
| EP | 2 903 348 A1 | | 8/2015 |

(Continued)

OTHER PUBLICATIONS

U.S. Appl. No. 16/499,176, filed Sep. 27, 2019.

(Continued)

*Primary Examiner* — Iqbal Zaidi
(74) *Attorney, Agent, or Firm* — PV IP PC; Wei Te Chung; Zhigang Ma (57) ABSTRACT

A method of conducting bearer reconfiguration in a cellular communications network, the method comprising the steps of at a network component, initiating reconfiguration of a bearer between a base station and a mobile device; transmitting a signal from the network component to the mobile device; wherein the signal includes information defining the reconfiguration and also defining additional instructions in conjunction with that reconfiguration.

17 Claims, 6 Drawing Sheets

(56) References Cited

U.S. PATENT DOCUMENTS

2017/0111832 A1    4/2017  Wen et al.
2018/0220336 A1*   8/2018  Hong ................ H04W 36/0016
2018/0302834 A1*  10/2018  Zhang ............... H04W 36/0022
2018/0324641 A1*  11/2018  Tsai .......................... H04L 1/08

FOREIGN PATENT DOCUMENTS

| WO | 2006/035297 | A1 | 4/2006 |
| WO | 2010/105145 | A1 | 9/2010 |
| WO | 2016/021890 | A1 | 2/2016 |
| WO | 2016021890 | A1 | 2/2016 |
| WO | 2016/043527 | A1 | 3/2016 |
| WO | 2016/195735 | A1 | 12/2016 |

OTHER PUBLICATIONS

Ericsson, Tdoc R2-1704415, "Bearer type switching in dual connectivity", 3GPP TSG-RAN WG2 #98, May 15-19, 2017.
"Spanning Tree Protocol", Wikipedia, available from: en.wikipedia.org/wiki/Spanning_Tree_Protocol [accessed Dec. 16, 2019].
3GPP, "Specification #36,331", Revision 14.2.2. 3gpp.org, Section 5.310.10, Apr. 20, 2017.
1st Office Action issued in corresponding Chinese Patent Application No. 201880024118.4, dated Sep. 28, 2022, pp. 1-7.

* cited by examiner

BEARER CONTROL

CROSS-REFERENCE TO RELATED APPLICATIONS

This application is a continuation of U.S. patent application Ser. No. 16/499,176, filed Sep. 27, 2019, which is a National Stage of International patent application PCT/CN2018/084158, filed on Apr. 24, 2018, which claims priority to Great Britain patent application No. GB 1709615.7, filed on Jun. 16, 2017. The disclosures of each of the above-noted applications are incorporated by reference in their entireties.

TECHNICAL FIELD

This disclosure relates to control of bearers in a cellular communication system. In particular the disclosure relates to methods for controlling a mobile device during reconfiguration of split bearers.

BACKGROUND

Wireless communication systems, such as the third-generation (3G) of mobile telephone standards and technology are well known. Such 3G standards and technology have been developed by the Third Generation Partnership Project (3GPP).

The $3^{rd}$ generation of wireless communications has generally been developed to support macro-cell mobile phone communications. Communication systems and networks have developed towards a broadband and mobile system.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by abase station known as a gNB.

Figure 1:
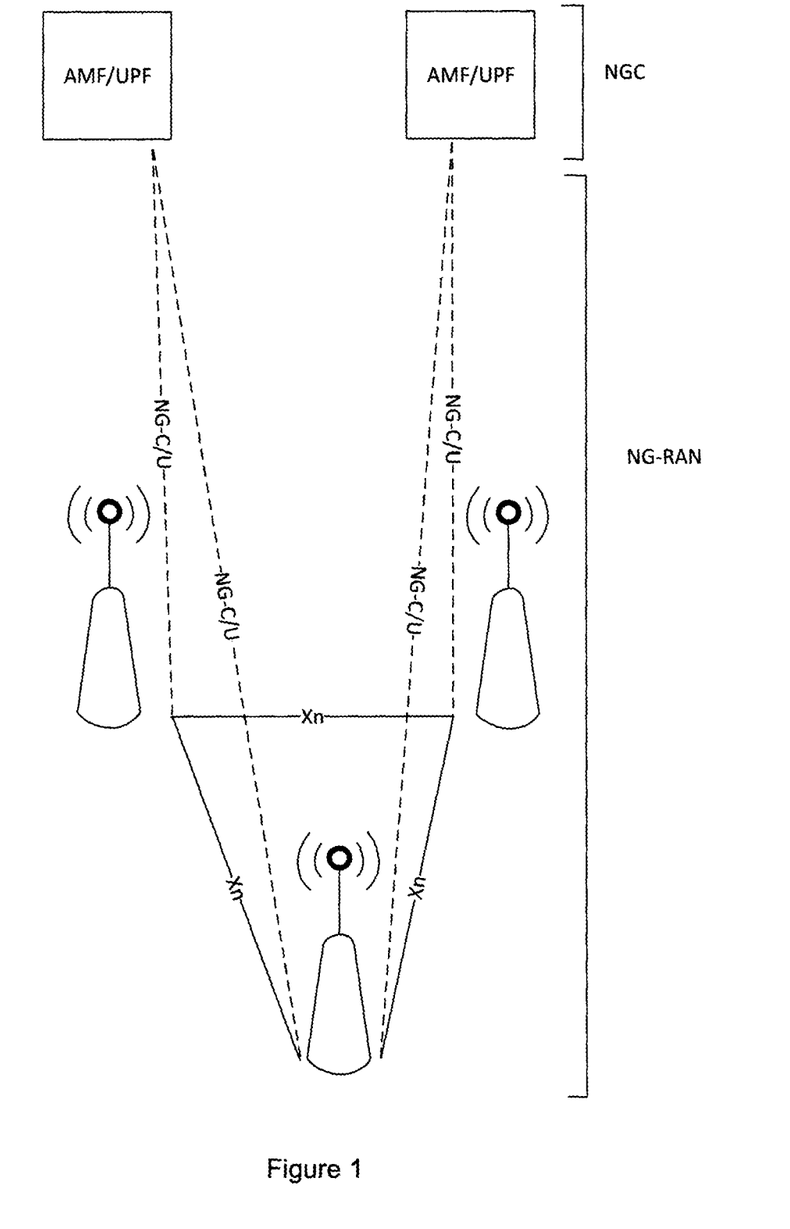
FIG. 1 shows a schematic network diagram.
Figure 2:
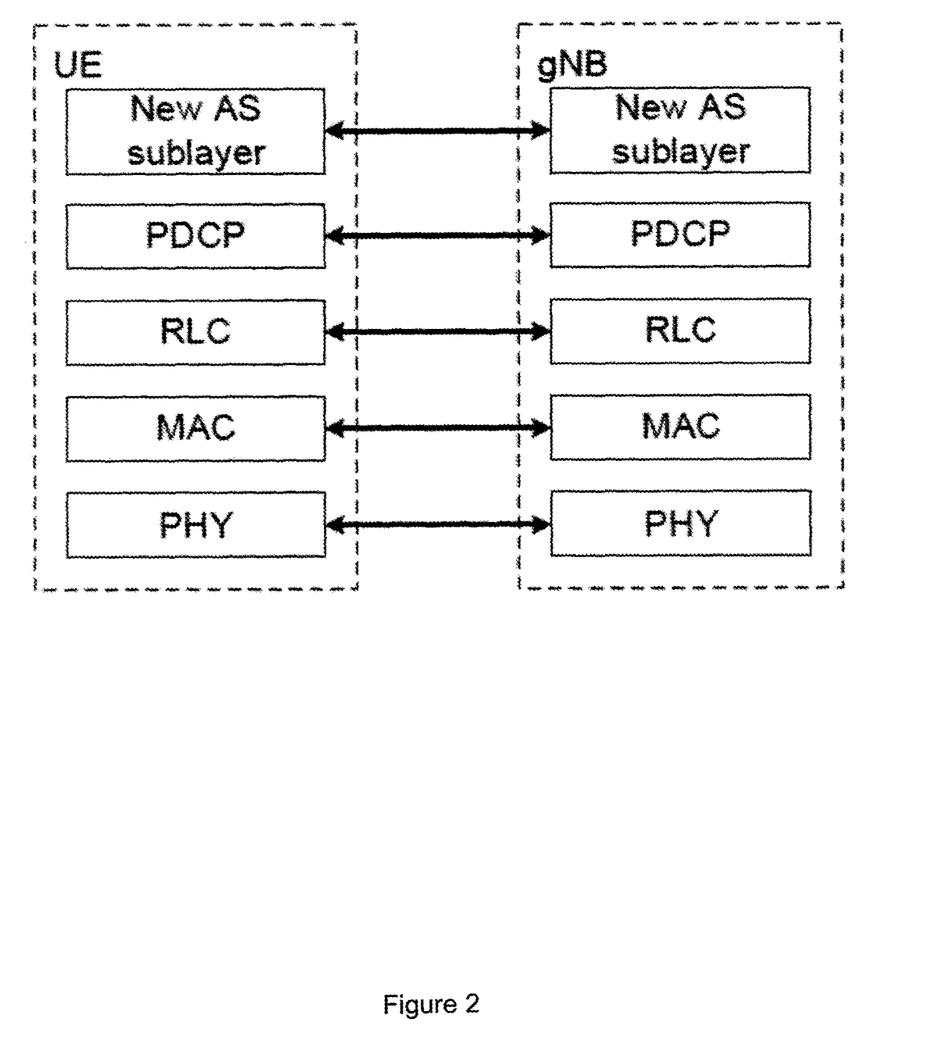
FIG. 2 shows user plane protocols.

FIG. 1 shows a schematic network diagram of the proposed Next Generation Radio Area Network (NG-RAN) for use with the NR radio link. The gNBs provide the NG-RAN user plane, which comprises a new AS sublayer and PDCP, RLC, MAC and PHY layers as shown in FIG. 2. The gNBs also provide control plane (RRC) termination towards UEs connected to a gNB. The term base station may be utilised to describe a network component operating as a gNB/eNB or a component having equivalent functionality in other network types.

gNBs are interconnected using the Xn interface and are connected to the Next Generation Core (NGC). The N2 interface provides the control plane interface to the Access and Mobility Management Function (AMF) of the NGC and the N3 interface provides the user plane interface to the User Plane Function of the NGC. These interfaces are defined in 3GPP TS 23.501.

A function known as Dual Connectivity enables radio resources from two cells to be utilised to provide a bearer to a mobile device. A master cell may be supported by a secondary cell. For example, a master NR cell from a gNB may be supported by a secondary LTE cell from an eNB, or vice-versa. Furthermore, both cells may be NR or LTE, and may be provided by one or more gNBs/eNBs. The serving cells associated with a master gNB (MgNB) or eNB (MeNB) are defined as the Master Cell Group (MCG) and the serving cells associated with a secondary gNB (SgNB) or eNB (SeNB) are defined as a Secondary Cell Group (SCG).

If radio conditions change the available radio resources may change and hence the bearer configuration may need to be changed. There is therefore a requirement for a method to allow efficient reconfiguration of resources in a Dual Connectivity system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of conducting bearer reconfiguration in a cellular communications network, the method comprising the steps of at a network component, initiating reconfiguration of a bearer between a base station and a mobile device;

transmitting a signal from the network component to the mobile device; wherein the signal includes information defining the reconfiguration and also defining additional instructions in conjunction with that reconfiguration.

The signal may be an RRC message.

The RRC message may comprise additional instructions applicable to layers which are not the RRC layer.

The signal may comprise messages transmitted via layers to which the information in the relevant message applies.

At least one of the messages may be transmitted via the PDCP layer and contains additional instructions to be implemented at the mobile device at the PDCP layer.

At least one of the messages may be transmitted via the MAC layer and contains additional instructions to be implemented at the mobile device at the MAC layer.

At last one of the messages may be transmitted via the RLC layer and additional instructions to be implemented at the mobile device at the RLC layer The additional instructions may comprise an indication to perform an SCG and/or MCG leg MAC reset.

The additional instructions may comprise an indication not to perform an SCG and/or MCG leg MAC reset.

The additional instructions may comprise an indication to perform SCG and/or MCG leg RLC re-establishment.

The additional instructions may comprise an indication not to perform SCG and/or MCG leg RLC re-establishment.

The additional instructions may comprise an indication to perform SCG and/or MCG leg RLC release.

The additional instructions may comprise an indication not to perform SCG and/or MCG leg RLC release.

The additional instructions may comprise an indication to perform PDCP re-establishment.

The additional instructions may comprise an indication not to perform PDCP re-establishment.

The additional instructions may comprise an indication to perform PDCP recovery.

The additional instructions may comprise an indication not to perform PDCP recovery.

There is also provided a cellular communications network configured to implement the methods described herein.

The signal may be received by a mobile device which may implement the requested reconfiguration and the additional instructions.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

A bearer used for communications between a mobile device and network may utilise only an MCG or SCG, or may be a split bearer across both an MCG and SCG.

Figure 3:
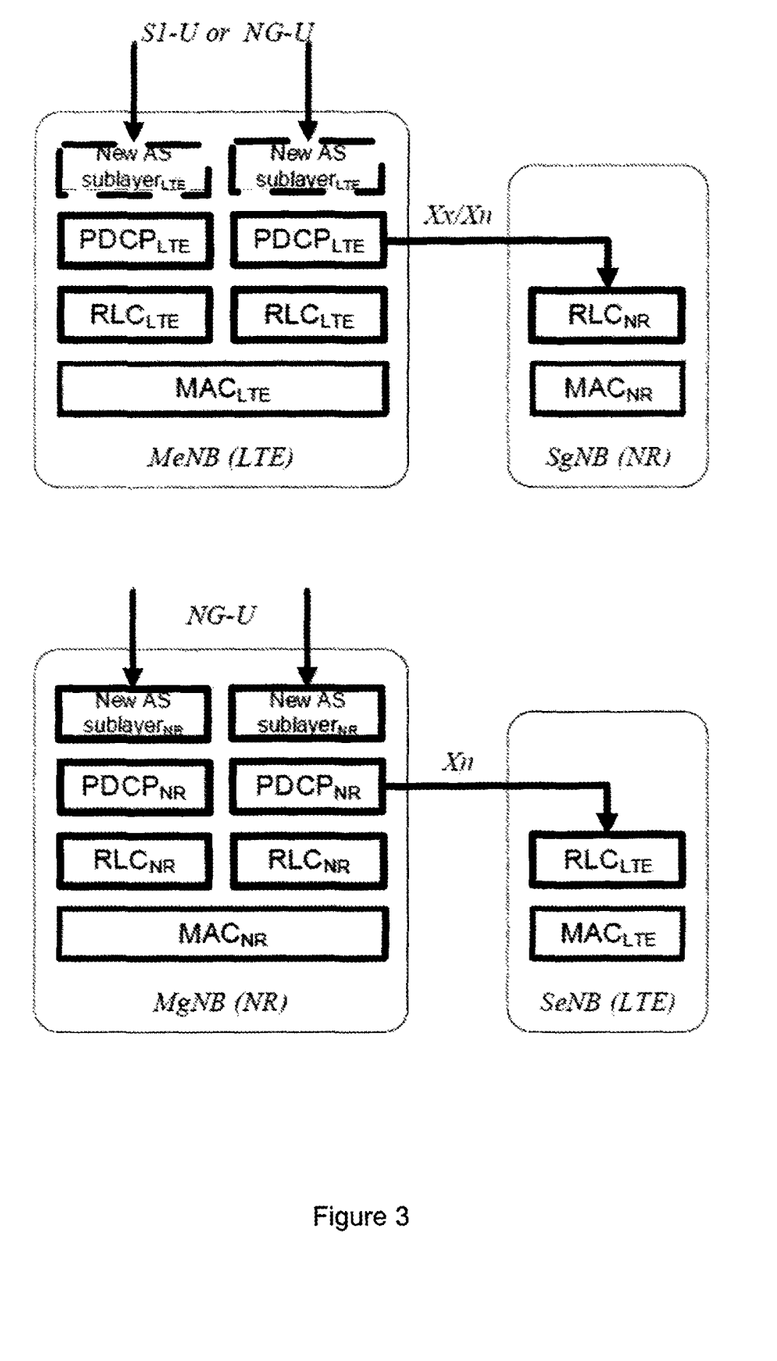
FIGS. 3-5 show bearer configurations.
Figure 4:
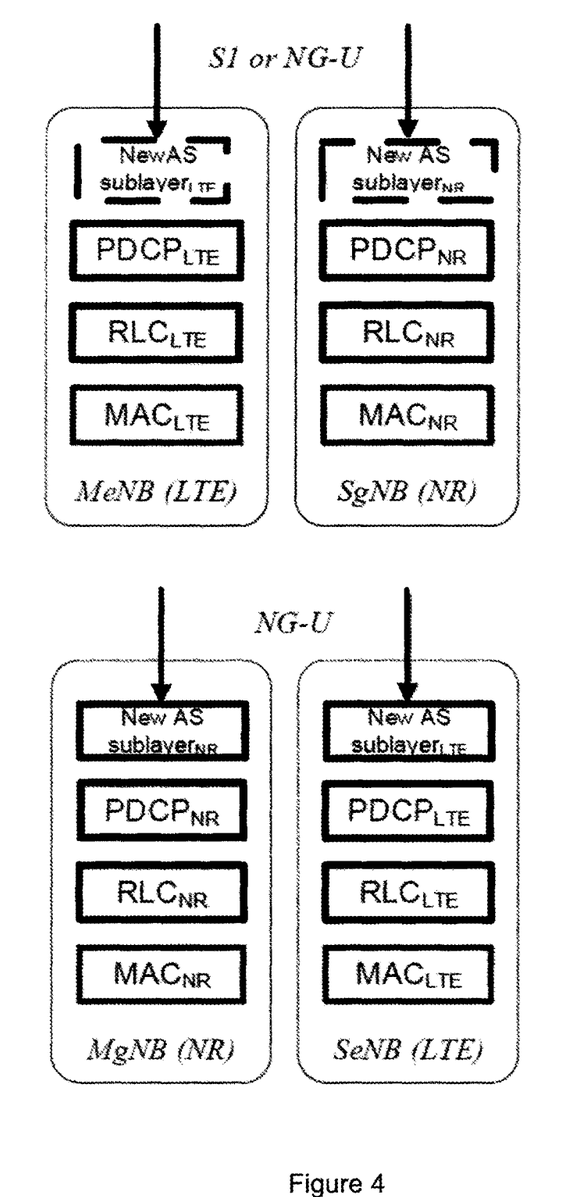
Figure 5:
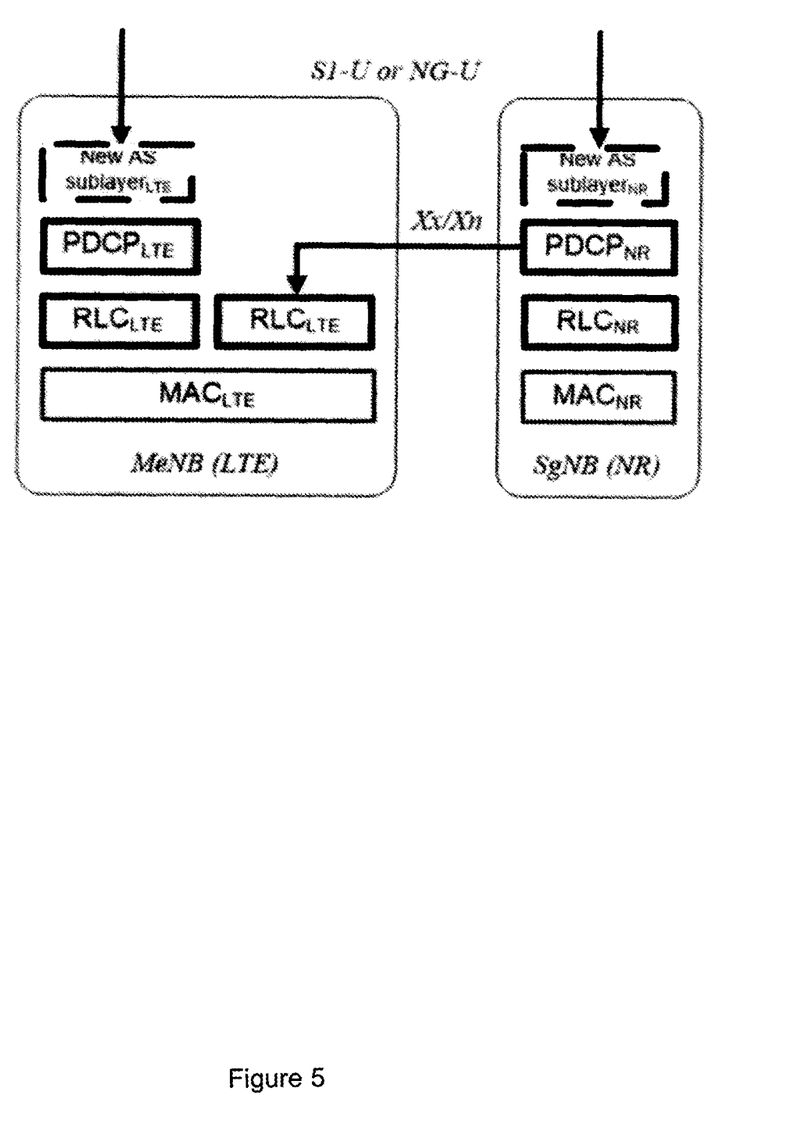

FIGS. 3-5 show examples of bearer configurations being considered for Dual Connectivity using NR and LTE. In particular, FIG. 3 shows two examples of a split bearer passing via the MCG, FIG. 4 shows MCG and SCG bearers, and FIG. 5 shows a split bearer via the SCG.

As noted above, transitions between types of bearer may be required to accommodate changing radio conditions. Conventional transitions between bearer types have been accomplished using the SCG reconfiguration procedure set out in TS 36.331, Section 5.3.10.10. That procedure requires that the SCG MAC is reset, SCG RLC/PDCP re-established, and as required a PDCP data recovery procedure is performed to ensure a lossless reconfiguration.

However, in some reconfigurations neither an SCG MAC Reset nor SCG RLC/PDCP reestablishment is required to avoid data interruption. For example, the PDCP entity in the network may not be changed by the reconfiguration. In order to improve the efficiency of the reconfiguration process a more detailed system for controlling reconfiguration is provided. The disclosed system provides per-bearer-leg control by the network of MAC Reset, RLC release/re-establishment, and PDCP re-establishment/recovery. Providing such control allows the network to control the details of a reconfiguration process that it instructs, hence ensuring the correct steps are taken for the particular reconfiguration process and avoiding unnecessary actions.

When a signal is transmitted from the network to a relevant UE to reconfigure bearers it is accompanied by an indication of the steps to be performed in support of that request. The indication may be transmitted utilising the RRC layer, or the layer to which the indication applies.

Utilising the RRC layer allows the control signals to be transmitted in conjunction with other RRC operations such as bearer type changes or bearer leg addition, thus allowing centralised operation from the RRC unit when the MAC/RLC/PDCP entities may not be located in the same network entity as the RRC entity. In contrast, utilising the relevant layer can allow control to be separated which may be advantageous for network deployments enforcing control plane/user plane function separation.

In an example, a single signal to a UE may indicate MAC reset, RLC re-establishment, and PDCP re-establishment regardless of a PDCP network entity change, and the PDCP security key is updated. Alternatively, the PDCP security key update can serve as a signal to indicate MAC reset, RLC re-establishment, and PDCP re-establishment. When PDCP network entity is changed, the MAC reset can be deactivated. The same network entity handles the PDCP security key update. Hence the data transmission interruption can be minimized at reconfiguration by not performing the MAC reset.

Similarly when the PDCP network entity is not changed and the PDCP security key is not updated, RLC and PDCP re-establishment, and MAC reset can be deactivated. Similarly when the PDCP network entity is changed and the PDCP security key is not updated, PDCP re-establishment, RLC re-establishment and MAC reset are performed.

The disclosed system therefore enables minimization of data transmission interruption by deactivating PDCP re-establishment and MAC reset when they are not necessary while allowing signalling to be minimised at the same time as improving flexibility in the functions performed at reconfiguration.

Figure 6:
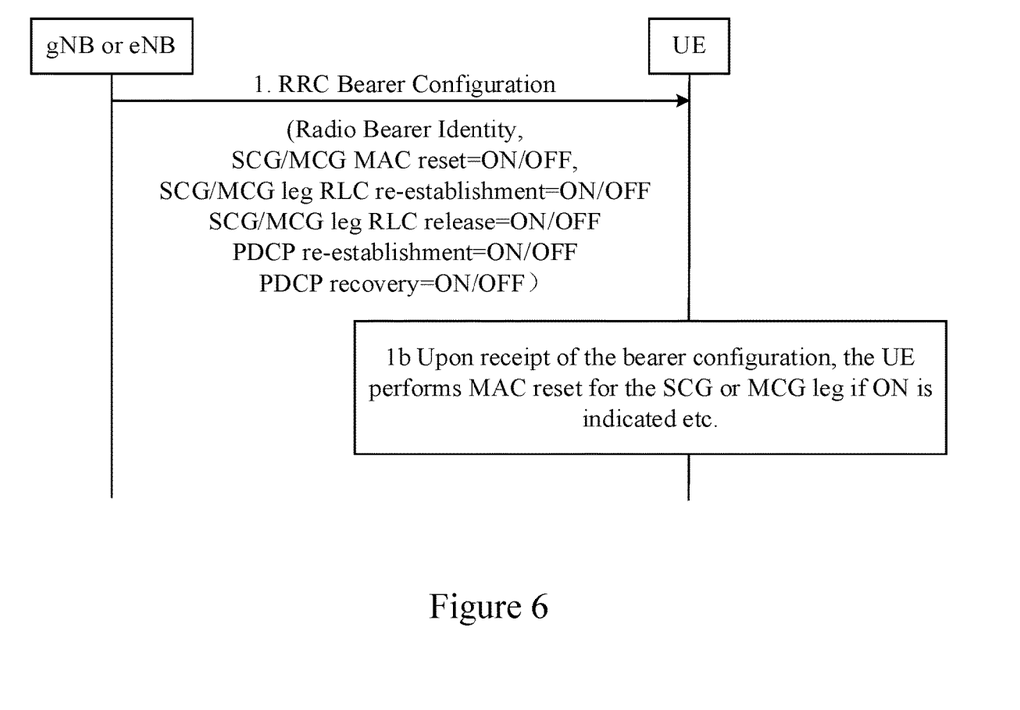
FIG. 6 shows a signalling flow chart.

FIG. 6 shows a signalling sequence during bearer reconfiguration for a UE connected in dual connectivity mode.

At step 60 the network transmits a request to the UE to reconfigure the bearer(s) in a particular way. This request includes whether the following steps should also be performed with the reconfiguration: —

SCG/MCG leg MAC reset
SCG/MCG leg RLC re-establishment
SCG/MCG leg RLC release
PDCP re-establishment
PDCP recovery In an example, the network may request an MCG bearer is switched to an SCG split bearer, PDCP is released, and RLC is re-established on the MCG leg of the split bearer.

Upon receipt of the request, at step 61, the UE implements the requested bearer reconfiguration and performs the further actions specified in the reconfiguration request. Since those actions are specific to the requested reconfiguration it is ensured that only required steps are taken, thus making the process more efficient. Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general-purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation. Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. In addition, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular, the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims.

Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of conducting reconfiguration in a cellular communications network, the method comprising the steps of:
   at a network component, initiating reconfiguration between a base station and a mobile device;
   transmitting a signal from the network component to the mobile device; wherein the signal includes information defining the reconfiguration and also defining additional instructions in conjunction with that reconfiguration;
   receiving the signal at the mobile device and implementing the requested reconfiguration and the additional instructions at the mobile device;
   wherein the additional instructions comprise an indication of whether to perform a Secondary Cell Group (SCG) and/or Master Cell Group (MCG) leg Media Cell Group (MAC) reset, an indication of whether to perform SCG and/or MCG leg Radio Link Control (RLC) re-establishment, an indication of whether to perform Packet Data Convergence Protocol (PDCP) reestablishment, an indication of whether to perform PDCP recovery.

2. The method according to claim 1, wherein the signal is a Radio Resource Control (RRC) message.

3. The method according to claim 2, wherein the RRC message comprises additional instructions applicable to layers which are not the RRC layer.

4. The method according to claim 1, wherein the signal comprises messages transmitted via layers to which the information in the relevant message applies.

5. The method according to claim 4, wherein at least one of the messages is transmitted via the PDCP layer and contains additional instructions to be implemented at the mobile device at the PDCP layer.

6. The method according to claim 4, wherein at least one of the messages is transmitted via the MAC layer and contains additional instructions to be implemented at the mobile device at the MAC layer.

7. The method according to claim 4, wherein at last one of the messages is transmitted via the RLC layer and additional instructions to be implemented at the mobile device at the RLC layer.

8. The method according to claim 1, wherein the additional instructions comprise an indication not to perform an SCG and/or MCG leg MAC reset.

9. The method according to claim 1, wherein the additional instructions comprise an indication not to perform SCG and/or MCG leg RLC re-establishment.

10. The method according to claim 1, wherein the additional instructions comprise an indication to perform SCG and/or MCG leg RLC release.

11. The method according to claim 1, wherein the additional instructions comprise an indication not to perform SCG and/or MCG leg RLC release.

12. The method according to claim 1, wherein the additional instructions comprise an indication not to perform PDCP re-establishment.

13. The method according to claim 1, wherein the additional instructions comprise an indication not to perform PDCP recovery.

14. The method according to claim 1, wherein a PDCP security key update initiates MAC reset, RLC re-establishment, and PDCP re-establishment.

15. The cellular communications network configured to implement the method of claim 1.

16. A method of conducting reconfiguration in a cellular communications network, the method comprising the steps of:
   at a network component, initiating reconfiguration between a base station and a mobile device;
   transmitting a signal from the network component to the mobile device; wherein the signal includes information defining the reconfiguration and also defining additional instructions in conjunction with that reconfiguration;
   wherein the additional instructions comprise an indication of whether to perform a Secondary Cell Group (SCG) and/or Master Cell Group (MCG) leg Media Cell Group (MAC) reset, an indication of whether to perform SCG and/or MCG leg Radio Link Control (RLC) re-establishment, an indication of whether to perform Packet Data Convergence Protocol (PDCP) reestablishment, an indication of whether to perform PDCP recovery,
   wherein the signal is a Radio Resource Control (RRC) message, and the RRC message comprises additional instructions applicable to layers which are not the RRC layer.

17. A method of conducting reconfiguration in a cellular communications network, the method comprising the steps of:
   at a network component, initiating reconfiguration between a base station and a mobile device;
   transmitting a signal from the network component to the mobile device; wherein the signal includes information defining the reconfiguration and also defining additional instructions in conjunction with that reconfiguration;
   wherein the additional instructions comprise an indication of whether to perform a Secondary Cell Group (SCG) and/or Master Cell Group (MCG) leg Media Cell Group (MAC) reset, an indication of whether to perform SCG and/or MCG leg Radio Link Control (RLC) re-establishment, an indication of whether to perform Packet Data Convergence Protocol (PDCP) reestablishment, an indication of whether to perform PDCP recovery,
   wherein the signal comprises messages transmitted via layers to which the information in the relevant message applies, and at least one of the messages is transmitted via the MAC layer and contains additional instructions to be implemented at the mobile device at the MAC layer.

* * * * *